United States Patent [19]
Ouyang et al.

[11] Patent Number: 5,909,742
[45] Date of Patent: Jun. 8, 1999

[54] METAL CLEANING METHOD

[75] Inventors: Jiangbo Ouyang, Bensalem; Philip D. Deck, Ardsley; William L. Harpel, Langhorne, all of Pa.

[73] Assignee: BetzDearborn Inc., Trevose, Pa.

[21] Appl. No.: 08/038,588

[22] Filed: Mar. 26, 1993

[51] Int. Cl.$^6$ .............................. C09K 13/04; C23G 1/02
[52] U.S. Cl. ................................ 134/3; 134/41; 252/79.1; 252/79.2; 252/DIG. 1
[58] Field of Search ..................... 134/3, 41; 252/79.1, 252/79.2, DIG. 1

[56] References Cited

U.S. PATENT DOCUMENTS

| | | | |
|---|---|---|---|
| 3,879,216 | 4/1975 | Austin | 134/4 |
| 4,017,334 | 4/1977 | Matsushima et al. | 148/6.15 R |
| 4,256,602 | 3/1981 | McLaughlin, Jr. | 252/142 |
| 4,349,448 | 9/1982 | Steele | 252/135 |
| 4,477,290 | 10/1984 | Carroll et al. | 158/6 |
| 4,521,332 | 6/1985 | Mildra | 252/257 |
| 4,599,116 | 7/1986 | King et al. | 134/2 |
| 4,776,974 | 10/1988 | Stanton et al. | 252/106 |
| 4,789,406 | 12/1988 | Holder et al. | 134/3 |
| 5,080,831 | 1/1992 | Van Eenam | 252/558 |

*Primary Examiner*—Zeinab El-Arini
*Attorney, Agent, or Firm*—Philip H. VonNeida

[57] ABSTRACT

A method of cleaning metal surfaces by using a composition of citric acid, a hydroxycarboxylic acid salt, a nonionic surfactant and a coupling agent is used for cleaning metal surfaces and methods of using the same.

4 Claims, No Drawings

METAL CLEANING METHOD

FIELD OF THE INVENTION

Disclosed are compositions and methods for cleaning metals with a weak acid cleaner that is low foaming and creates lower amounts of sludge.

BACKGROUND OF THE INVENTION

Cleaning treatments are employed in a variety of metal forming and coating processes. Cleaning operations remove oil and debris and precede conversion coating or other coating operations. Satisfactory treatment of such metals requires that any dirt and lubricants on the metals (from the forming, drawing and ironing operations) be removed. Both alkaline and acid cleaners are employed in the metal cleaning area.

In cleaning aluminum, both alkaline and acid cleaners provide effective cleaning, but present serious problems. Acid etching and cleaning with, for example, strong acids like sulfuric acid with hydrofluoric acid produce clean mirror bright surfaces. However, the use of acids for cleaning present safety and effluent disposal problems and also requires stainless steel equipment. For these reasons, alkaline cleaning and etching processes are favored in the aluminum processing industry. However, alkaline cleaners also produce effluent disposal problems.

An alkaline cleaning and etching process for aluminum is disclosed in U.S. Pat. No. 4,477,290 to Carroll et al. The low temperature alkaline cleaning and etching solution for aluminum disclosed comprises alkaline metal hydroxides and a chelating agent at temperatures of from 80 to 130° F. No other ingredients such as wetting agents which would cause foaming problems are required.

U.S. Pat. No. 4,521,332 to Milora discloses a highly alkaline aqueous cleaning dispersion for strip steel which comprises sodium hydroxide, a bulking agent such as sodium carbonate and a poly(acrylic acid) dispersing agent.

SUMMARY OF THE INVENTION

The present invention provides for compositions and methods for cleaning metals. It has been found that an aqueous solution of citric acid and hydroxycarboxylic acid salt combined with a nonionic surfactant and a coupling agent provide for effective metal cleaning.

DESCRIPTION OF THE RELATED ART

Metal cleaning compositions and methods of using are known. U.S. Pat. No. 4,349,448 discloses a low temperature, low foaming alkaline cleaner composition comprising an alkaline portion, an ethoxylated alkyl phenol and an ethoxylated and propoxylated alkyl phenol. This composition can perform at temperatures as low as 60° F. U.S. Pat. No. 4,477,290 discloses a process for cleaning and etching the surface of an aluminum container employing an aqueous solution of an alkali metal hydroxide and a chelating agent at an elevated temperature.

U.S. Pat. No. 4,017,334 employ an aqueous solution having an acidic pH containing a vegetable tannin, a titanium compound, a fluoride compound, and a phosphate compound to treat aluminum to impart corrosion resistance. U.S. Pat. No. 4,256,602 discloses an aqueous cleaning composition for aluminum comprising sulfuric acid, wetting agents and a fluoroborate complex. This composition is effective in the pH range of 0.8 to 1.5 and a temperature range of 80 to 130° F.

DETAILED DESCRIPTION OF THE INVENTION

The present invention is directed towards compositions and methods for cleaning metal comprising an aqueous composition of citric acid, a hydroxycarboxylic acid salt, a nonionic surfactant and a coupling agent.

These metal surfaces include aluminum, cold rolled steel, galvanized steel, and galvalume (a trademark of Bethlehem Steel Corporation). This weak acid cleaner avoids the disadvantages of traditional metal cleaners such as corrosive effects, large volumes of sludge and high cost waste treatment. The cleaner of the present invention has a low metal etch rate and generates small amounts of smut while effectively cleaning the metal surface, which is both environmentally and economically favorable.

The present invention is effective at removing lubricant contamination, such as light molecular weight lubricant oils used in the metal milling and drawing industry, from the surface of the metal.

The processes of the invention comprise contacting the metal surfaces to be cleaned with the aqueous cleaning compositions of the invention using any of the contacting techniques known in the art, such as conventional spray or immersion methods, spraying being preferred.

In a preferred embodiment, the ingredients are added in the form of an aqueous solution. Advantages of using such solutions are ease of handling, bulk storage capability, and the avoidance of premixing. The compositions of the present invention are most effective at cleaning metal surfaces when the HLB of the surfactant is between about 3 and about 8.

The preferred nonionic surfactant is ethoxylated trimethylnonanol and the preferred coupling agent is sodium xylene sulfonate. The preferred hydroxycarboxylic acid salt is sodium citrate.

A preferred aqueous concentration in accordance with the present invention comprises:

| Ingredient | Concentration |
| --- | --- |
| Water | 72.4% W/W |
| Citric Acid | 20.0% |
| Sodium Citrate | 3.0% |
| Tergitol ® TMN-6 | 0.6% |
| Witconate ™ SXS | 4.0% |

Tergitol® TMN-6 is available from Union Carbide Chemical and Plastics Company.

Witconate™ SXS is available from Witco Corp.

The cleaning solutions are effective to clean the metal surfaces at temperatures from about 130 to 160° F. The cleaner composition is stable at both freezing and elevated temperatures. The cleaner composition may also be formulated as more concentrated stable packages. The present invention is effective up to 2.0% oil loading, but higher concentrations of lubricants can be treated by increasing the concentration of the inventive composition. Preferably it is diluted to 2.5% by volume prior to use.

Following the cleaning step, the metal surfaces can be rinsed with water to remove the cleaning solution. The metal surface may then be treated with coating solutions or siccative finish coatings well known to the art.

This invention will now be further described with reference to a number of specific examples which are to be regarded solely as illustrative, and not as restricting the scope of the invention.

EXPERIMENTAL

Testing was performed utilizing T-Bend, cross-hatch, cross-hatch/reverse impact and acetic acid salt spray were conducted. The cleaning efficacy of the cleaner was judged by estimating the percent water break free (WBF) on a cleaned metal surface.

The cleaner composition employed in these tests was the preferred inventive composition comprising:

| | |
|---|---|
| 72.4% W/W | Water |
| 20.0% | Citric Acid |
| 3.0% | Sodium Citrate |
| 0.6% | Tergitol ® TMN-6 |
| 4.0% | Witconate ™ SXS |

The T-bend test measures the tendency for paint to disadhere from a 180 degree bend in the metal ("OT"= perfect). The cross-hatch and cross-hatch/reverse impact tests measure the tendency of paint to disadhere from areas between closely spaced lines through the paint (10=perfect). The acetic acid salt spray (AASS) is per ASTM B-287 (10=perfect).

Foaming propensity is measured by the foam weight after 5 minutes bath circulation. The tests were run using incremental oil loading and using a 2.5% solution of the preferred inventive composition with a 10 second spray. Alcan 3105 aluminum coil was the surface treated. These results are presented in Table I.

TABLE I

Alcan 3105 aluminum coil
2.5% cleaner solution
10 second spray at 150° F.

| Oil Loading | WBF (%) | Foam (mm) |
|---|---|---|
| 0.0% | 100 | 0 |
| 0.1% | 100 | 0 |
| 0.5% | 100 | 0 |
| 1.0% | 100 | 0 |
| 2.0% | 95 | 1 |

As seen in Table I, the inventive composition maintained its cleaning efficiency up to 2.0% oil loading.

After cleaning with the inventive composition and treating with Betz Permatreat® 1011, Alcan 3105 aluminum coil was painted with several different paint systems. The testing performed indicated good corrosion resistance and good paint adhesion. These results are presented in Table II.

TABLE II

Alcan 3105 Aluminum Coil

| Cleaner | Paint | T-Bend | XH | RI/XH | AASS (500 Hour) Scribe | Field |
|---|---|---|---|---|---|---|
| Inventive Cleaner | A | 1T | 5B | 5B | 9 | 9 |
| " | B | 2T | 5B | 5B | 8 | 8 |
| " | C | 3T | 5B | 5B | 9 | 9 |
| Betz Kleen$^R$4004 | A | 1T | 5B | 5B | 8 | 9 |
| " | B | 2T | 5B | 5B | 8 | 8 |
| " | C | 2T | 5B | 5B | 7 | 8 |

A = Valspar polyester primer and Valspar fluoropolymer top coat
B = PPG Polyester single coat
C = PPG acrylic white single coat
Betz Kleen$^R$4004 is available from Betz Laboratories, Inc., Trevose, PA.

These results further indicated that the inventive composition provides better corrosion resistance and paint adhesion than a conventional, commercial, alkaline metal cleaner.

An aluminum loading test was performed on a coil line using the preferred inventive composition. High cleaning efficiency was observed in the 8 liter tank with 2.5% cleaner under continuous loading conditions. WBF was close to 100% with slight water break at the foil edges. The etch rate of aluminum in 2.5% cleaner was 0.071 mg/ft$^2$/s. The results of this testing are presented in Table III.

TABLE III

| Footage (Ft$^2$) | Free Acidity | Total Acidity | pH | Conductivity (umho) | Aluminum (ppm) |
|---|---|---|---|---|---|
| 0 | 2.9 | 4.2 | 2.73 | 1900 | 15 |
| 182 | 2.5 | 3.8 | 2.89 | 2000 | 41 |
| 364 | 2.6 | 4.0 | 2.68 | 2400 | 44 |
| 727 | 3.2 | 4.7 | 2.79 | 2700 | 53 |
| 864 | 3.8 | 5.3 | 2.80 | 2700 | 56 |
| 1093 | 3.8 | 6.1 | 2.71 | 3200 | 65 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for preparing metal surfaces for the application of paint and siccative coatings thereto comprising adding an effective amount to said metal surfaces of an aqueous solution of citric acid, a hydroxycarboxylic acid salt, a nonionic surfactant having an HLB of about 3 to about 8 and sodium xylene sulfonate.

2. The method as claimed in claim 1 wherein said nonionic surfactant is ethoxylated trimethylnonanol.

3. The method as claimed in claim 1 wherein said hydroxycarboxylic acid salt is sodium citrate.

4. The method as claimed in claim 1 wherein said solution is diluted to a concentration of 2.5% by volume.

* * * * *